US008899403B2

United States Patent
Keller

(10) Patent No.: US 8,899,403 B2
(45) Date of Patent: Dec. 2, 2014

(54) METHOD FOR OPERATING A TRANSPORT DEVICE AND TRANSPORT DEVICE FOR IMPLEMENTING THE METHOD

(75) Inventor: Roland Keller, Greifensee (CH)

(73) Assignee: Ferag AG, Hinwil (CH)

( * ) Notice: Subject to any disclaimer, the term of this patent is extended or adjusted under 35 U.S.C. 154(b) by 631 days.

(21) Appl. No.: 13/273,014

(22) Filed: Oct. 13, 2011

(65) Prior Publication Data

US 2012/0090958 A1    Apr. 19, 2012

(30) Foreign Application Priority Data

Oct. 13, 2010   (CH) ...................................... 1672/10

(51) Int. Cl.
*B65G 17/20* (2006.01)
*B65H 29/00* (2006.01)
*B65H 43/08* (2006.01)

(52) U.S. Cl.
CPC .............. *B65H 29/003* (2013.01); *B65G 17/20* (2013.01); *B65H 2511/30* (2013.01); *B65H 2511/40* (2013.01); *B65H 2511/51* (2013.01); *B65H 43/08* (2013.01); *B65H 2553/23* (2013.01); *B65H 2701/1932* (2013.01); *B65H 2553/52* (2013.01); *B65H 2553/24* (2013.01)
USPC .................... 198/349.95; 198/617; 198/470.1; 198/803.3

(58) Field of Classification Search
USPC ................. 198/349, 349.95, 470.1, 644, 617
See application file for complete search history.

(56) References Cited

U.S. PATENT DOCUMENTS

| 3,696,946 | A | | 10/1972 | Hunter et al. |
| 4,274,783 | A | | 6/1981 | Eineichner et al. |
| 4,968,081 | A | * | 11/1990 | Beight et al. .................. 294/104 |
| 5,884,747 | A | | 3/1999 | Sandstedt et al. |
| 7,455,171 | B2 | * | 11/2008 | Buechel ...................... 198/502.2 |
| 7,712,603 | B2 | * | 5/2010 | Mader ........................... 198/644 |
| 8,036,772 | B2 | * | 10/2011 | Mader ........................... 700/213 |
| 2005/0061621 | A1 | | 3/2005 | Cruysen et al. |

FOREIGN PATENT DOCUMENTS

DE        696 17 400 T2   8/2002
DE   60 2004 003 182 T2   9/2007

* cited by examiner

*Primary Examiner* — Mark A Deuble
(74) *Attorney, Agent, or Firm* — Pauley Petersen & Erickson

(57) ABSTRACT

The invention relates to a method for operating a transport device (10) which has a number of identical transport means arranged one after another in a transport direction, which are able to transport product along an intrinsically closed transport path (33) between stations (28) arranged on the transport path (33). To identify the individual transport means, use is made of selected transport means (RK) which can be detected by means of first sensors (24) arranged or on the transport path (33) as the said transport means pass the first sensors (24), which are distributed over the transport path (33) and subdivide the transport path (33) into individual segments. The transport means may be assigned individually consecutive fixed serial numbers, which are counted from a single starting point (34), and in that the starting point (34) is defined by a specific arrangement of a plurality of detectable transport means (DRK).

15 Claims, 4 Drawing Sheets

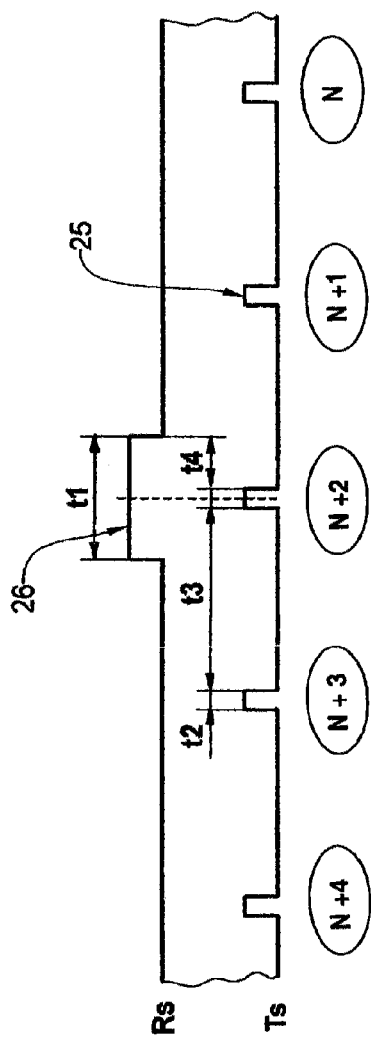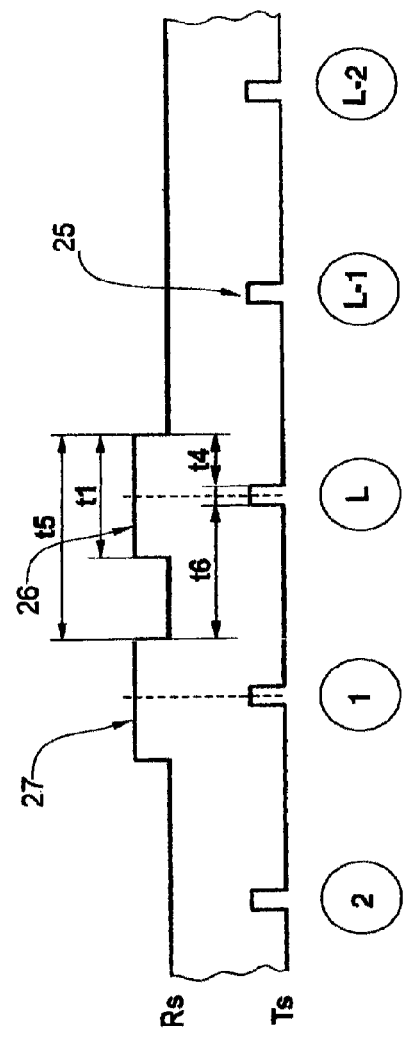

METHOD FOR OPERATING A TRANSPORT DEVICE AND TRANSPORT DEVICE FOR IMPLEMENTING THE METHOD

CROSS REFERENCE TO RELATED APPLICATION

Swiss Patent Reference 01672/10, filed 13 Oct. 2010, the priority document corresponding to this invention, and its teachings are incorporated, by reference, into this specification.

BACKGROUND OF THE INVENTION

1. Field of the Invention

The present invention relates to the field of transport technology, in particular in the area of post press processing. It relates to a method for operating a transport device and a transport device for implementing the method.

2. Discussion of Related Art

In the area of post press processing, in which printed materials which come from a printing press are processed further by means of gathering, folding, inserting, stapling or the like to form a finished printed product, a newspaper, brochure or the like, when high processing throughputs of, for example, several 10 000 products per hour are involved, use is made of specific transport devices like the known gripper transporters in order to be able to transport the large quantities of products which accumulate between various further processing stations in a short time.

Together with the associated transport devices, the various further processing stations form processing lines, on which the products are subjected to predefined processing steps. In order to increase the flexibility of the further processing, processing lines are increasingly being devised on which the products passing through can be fed as desired to different processing steps. For instance, it is possible, in a transport device having a closed circulation, to arrange for selected products to circulate repeatedly in order to feed them repeatedly to the same processing step (insertion or the like).

In order that such a flexible mode of operation can be carried out with the necessary freedom from error, it must be possible to track the location of the individual products within the transport device without ambiguity. If, for example in a gripper transporter, a product which is to be processed by a processing station is located in a specific gripper of the transporter, the processing station must know when this gripper is located in its area of access in order that it can make access to the correct gripper.

Beginning a specific length of the transport device or beginning at a specific number of grippers in the gripper transporter, an additional source of error with regard to tracking the position of the product within the transport device is introduced by the play between the individual mechanical elements in the transporter. The play between the individual elements adds up, so that when starting up and braking, the actual distances between the elements change. In the case of elements which, for example, are arranged far from one another in a chain, this effect—also called "jitter"—can lead to the situation in which the relative position of the elements can no longer be determined unambiguously. Even with a known position of individual elements, as a result of the "jitter" it is not possible to conclude accurately about the position of far-removed elements.

Furthermore, in the event of a breakdown in the transport device, it is important to be able to detect quickly and reliably after the plant has been started up again where the individual product or grippers are currently located, in order that the predefined processing program can be continued without error.

From WO 2008/043194 A2 it is known to provide flexible flat products, preferably printed products, which have been produced in a conventional high performance printing process, with an identification means in the form of an RFID tag, between the high performance printing device, and a first further processing device connected downstream of the printing device. In this case, the RFID tags do not need to be attached directly in or to the printed product; instead they can also be assigned detachably, temporarily physically directly, to the printed product. The identification means can in this case be formed, for example, in a transport unit assigned to the printed product for a specific period and a specific section of the transport path, for example a support of a ladder conveyor or a gripper of a gripper transporter. Such a temporary ability to identify a gripper remains product-based, however, and therefore does not create the ability to identify the transport means permanently and unambiguously overall.

From WO 2008/144945 A2 it is known to provide tags that can be read in and/or out without contact on the clamps of a gripper transporter, in order to read predefined quantities of data into and/or out of the tags of a gripper, to bring a read-in/read-out device into the vicinity of the respective gripper and to move it together with the respective gripper over a selected section of the transport path. In this way, despite the high linear speeds of the grippers during operation, it is possible not only to identify the gripper unambiguously but also to establish and to document its history, operating data and its partial or complete failure at any time. For instance, it is firstly possible to ensure that, during repair of the gripper following a failure, the correct replacement parts are installed. Furthermore, in the event of a fault, the gripper which has caused the breakdown can be identified immediately and, following a repair, the plant can be started up again where it has stopped. Finally, the individualization of the grippers can advantageously be used to control the plant if, for example, specific grippers with specific products are to be branched out (removed) from the advancing series of grippers and fed to separate processing operations. In this case, the identity of the grippers is checked continuously and the branching operation is initiated when the gripper sought has reached the branching point. In a corresponding way, the gripper branched off with the separately processed product can be introduced (input) into the product stream again later at a predetermined location. To this end, the tags that are used are preferably tags that can be read in and/or out by radio, in particular in the form of RFIDs. This type of individualization of the grippers by equipping each gripper with an individual feature in the form of a readable label is comparatively complicated, since here each individual gripper must be treated specifically.

EP 0 961 188 A1 indicates a method for controlling conveyance and processing of piece goods which is simple in terms of control engineering and less complicated in terms of apparatus, in such a way that it can be applied both to systems having conveyor chains of any desired length and also to systems having more or less mutually independent holding means (e.g. grippers of a gripper transporter), to be specific when an extremely wide range of stations are used at freely selectable points of the conveying path, for actions which relate to every object or holding means conveyed in or only to a specific selection of objects or holding means. In addition, when the method is used, the effort for commissioning, for a cold start, for statistical monitoring of the holding means condition and for maintenance work in which holding means are replaced is intended to be a minimum.

To this end, a plurality of holding means that can be moved on an intrinsically closed conveying path are equipped as signal generators. Each station has sensory means for generating a signal when a signal generator is conveyed through. Furthermore, the stations have a clock generator internal to the station or sensory means for detecting holding means conveyed in, and also a counter for counting the cycles of the clock generator or for counting the holding means conveyed through.

By means of a signal generated by a signal generator in a station, the counter in the station is reset and, if appropriate, a phase shift between station clock and conveying clock is registered or set to zero. Between each two signal generators, a number of holding means not equipped as signal generators are provided, the number being different for each pair of signal generators. By means of the number of holding means between a first signal generator arranged downstream in the flow and a second signal generator arranged upstream in the flow, which number is counted and registered as station cycles or sensor-registered holding means, the second signal generator can be identified unambiguously (signal generator identification). By means of the current counter reading and the signal generator identification of the preceding signal generator, each holding means which is currently being conveyed through a reference point of the station can be identified unambiguously. Important to the success of this method is the non-equal segmentation of the conveying path by means of the pairs of signal generators which, in pairs, must have a different spacing. However, maintaining these different spacings entails organisational effort.

DE 696 17 400 T2 discloses a method for identifying and finding a gripper during the transport of printed materials with the aid of a gripper conveyor, the gripper conveyor being subdivided into a number of gripper sections and the gripper sections being made sufficiently short to avoid disruptive length changes of the relevant sections during operation. The provision of a characteristic identification code for each section makes it possible for the section and the start of the said section to be identified. By allocating a characteristic identity to the gripper on the basis of the membership of the latter to its section and on the basis of its position in the latter, it is possible for the gripper to be found reliably by sensing the section code and the address of the gripper within its specific section. However, with this technique, simplified continuous numbering of the grippers or clamps over the entire conveying section is not possible.

SUMMARY OF THE INVENTION

It is an object of the invention to improve a method of the generic type to the effect that unambiguous identification of the individual transport means is possible at any time in a simple and reliable manner and in particular with reduced expenditure on the transport means and the transport device, and also to specify a transport device for implementing the method.

The object is achieved by the features of claims 1 and 11.

The method according to the invention is based on a transport device which has a large number of identical transport means arranged one after another in a transport direction, which transport means in each case are able to pick up at least one product to be transported, in particular a product in post press processing, and are able to transport it along an intrinsically closed transport path between stations arranged on the transport path. In order to identify the individual transport means, use is made of selected transport means the position of which can be detected by means of first sensors arranged indirectly or directly on the transport path as the said transport means pass the first sensors, and which are arranged distributed over the transport path and subdivide the transport path into individual segments. The method according to the invention is distinguished by the fact that all the transport means are assigned individually consecutive fixed serial numbers, which are counted from a single starting point, and by the fact that the starting point is defined by a specific arrangement of a plurality of detectable transport means.

One refinement of the method according to the invention is characterized in that the starting point is defined by at least two directly successive detectable transport means.

In particular, in this case the starting point coincides with the second of the two or, respectively, the last of the plurality of successive detectable transport means.

Another refinement of the method according to the invention is characterized in that the selected or detectable transport means are arranged distributed uniformly along the transport path or the segments of the transport path are equally long.

A further refinement is distinguished by the fact that, as the transport means move along the transport path, by means of second sensors arranged on the transport path through the transport device, a clock signal is generated, the clock pulses of which can be assigned to the transport means, and that the clock pulses are additionally used to identify the individual transport means.

In particular, as the first sensors pass through the selected transport means, a reference signal is generated, the reference pulses from which can be assigned to the selected transport means. The assignment is carried out unambiguously and the reference pulses are preferably correlated with selected clock pulses.

The reference pulses and the selected clock pulses correlated therewith are preferably in each case located symmetrically with respect to a common centre line.

Another refinement of the method according to the invention is characterized in that a map of the transport device is used, preferably a clock cycle map, which comprises compartments numbered in accordance with the numbered transport means of the transport device, into which an entry can be made or in which an entry can be activated when the corresponding transport means picks up a product to be transported. In a manner analogous to this, an entry can be deleted or inactivated when the corresponding transport means gives up a transported product or one such is removed from the transport means.

A development of this refinement is distinguished by the fact that the stations arranged on the transport path make access to the map of the transport device and make or delete corresponding entries when they introduce a product into a transport means or remove one from a transport means.

A still further refinement of the method is characterized in that the transport device is a gripper transporter, in that the transport means in each case comprise a gripper to hold a product detachably, and that the grippers are fixed to a chain which is used to generate a clock signal.

The transport device according to the invention for implementing the method has a multiplicity of identical transport means arranged one after another in a transport direction, which transport means in each case are able to pick up a product to be transported, in particular a product in post press processing, and are able to transport it along an intrinsically closed transport path between stations arranged on the transport path, first sensors being arranged on the transport path, which are able to detect selected transport means arranged distributed along the transport path as they pass. It is distinguished by the fact that a single selected point in the series of transport means is defined by a specific arrangement of a plurality of detectable transport means.

One refinement of the transport device according to the invention is characterized in that the selected point is defined by two directly successive detectable transport means.

According to another refinement, the selected transport means each have at least one signal generator, for example a cam switch, together with which it is moved past the first sensors during the operation of the transport device. The signal generators can be constructed in the form of active or passive signal generators which can be detected by means of optical, inductive, capacitive and further sensors. Apart from the aforementioned cam switch, a signal generator can also be constructed as an optically detectable marking, as an optically detectable barcode, as a reflector or as a passive RFID tag. According to one embodiment, the signal generators are rewritable RFID tags which, in the event of exchanging, adding or removing individual transport means, can simply be rewritten with the necessary signal information.

By using the present disclosure, it is easy for those skilled in the art to understand that the invention can also be implemented by all the transport means in the transport device being constructed as detectable transport means and by the single selected point in the series of transport means being defined by a specific arrangement of a plurality of non-detectable transport means. Instead of a signal described previously, the desired information in this case is generated by the absence of a signal to be expected.

According to a further embodiment, all the transport means are provided with a signal generator that can be activated/deactivated, for example a rewritable RFID tag. Instead of physically constructed signal generators like a cam switch or a bar marking, individual RFIDs of individual transport means perform the function of the signal generators in that they are written with appropriate readable signal generator information. The remaining RFID tags are not written in such a way and are not detected by the system as transport means marked with a signal generator. In addition to and independently of the signal generator information, still further information can be stored on the RFID tag.

A further refinement of the transport device is characterized in that the transport means are fixed to a chain, and second sensors for sensing the individual links of the chain are arranged in the region of the chain.

A further refinement of the transport device is characterized in that the transport means in each case comprise a gripper for holding a product detachably.

BRIEF DESCRIPTION OF THE DRAWINGS

The invention is to be explained in more detail below by using exemplary embodiments in conjunction with the drawing, in which:

FIG. 4 shows the time correlation of clock signals and reference signal from a selected transport means according to an exemplary embodiment of the invention;

FIG. 5 shows the time correlation of clock signals and reference signals of the plurality of selected transport means defining the starting point according to an exemplary embodiment of the invention;

DESCRIPTION OF PREFERRED EMBODIMENTS

Figure 1:
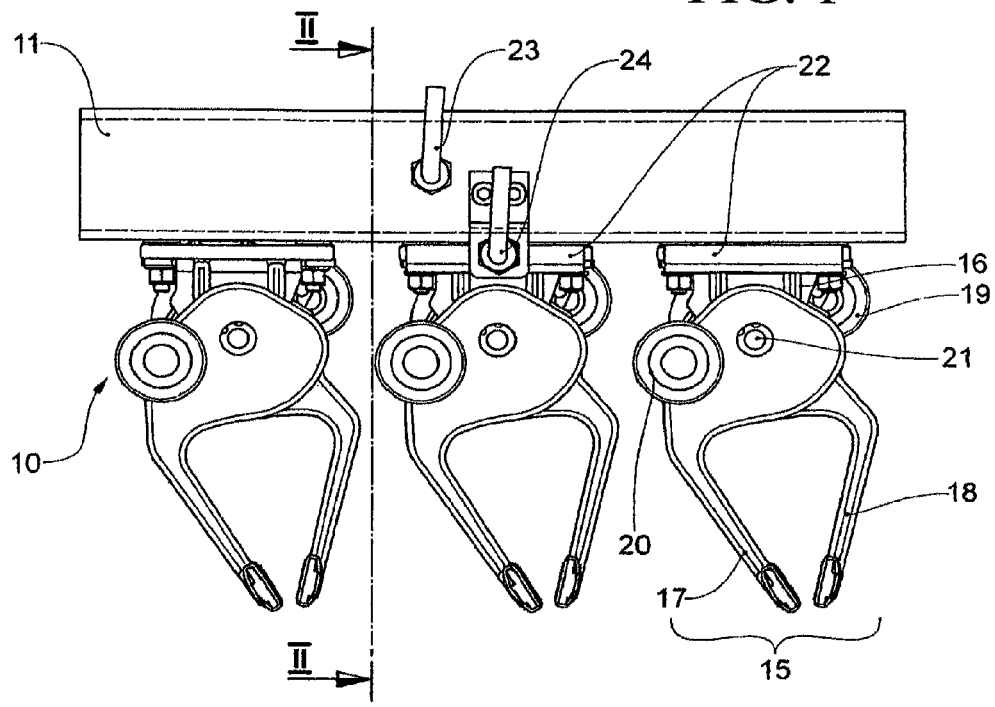
FIG. 1 shows a side view of a short section of a transport device in the form of a gripper transporter according to an exemplary embodiment of the invention.

FIG. 1 shows a side view of a short section of a transport device in the form of a gripper transporter according to an exemplary embodiment of the invention. The gripper transporter 10 has a chain 12, which is assembled from individual links, which each comprise a pair of mutually spaced running wheels 13 with a common axle 14. The chain 12 runs in a chain guide 11 of rectangular cross section, which is open towards the bottom in the region between the running wheels 13. Fixed to the chain links, in each case outside the chain guide 11, is a U-shaped supporting bracket 16, on which a gripper 15 known per se is suspended (see, for example, EP 2 172 407 A2).

Gripper 15 comprises two gripper legs 17 and 18, which can be pivoted towards each other about a gripper axis 21 such that they are able to grip and hold a flat printed product hanging downwards. The gripper legs 17 and 18 are assigned corresponding control rollers 19 and 20, which permit the gripper 15 to be opened and closed by interacting with corresponding control cams (not shown).

Figure 2:
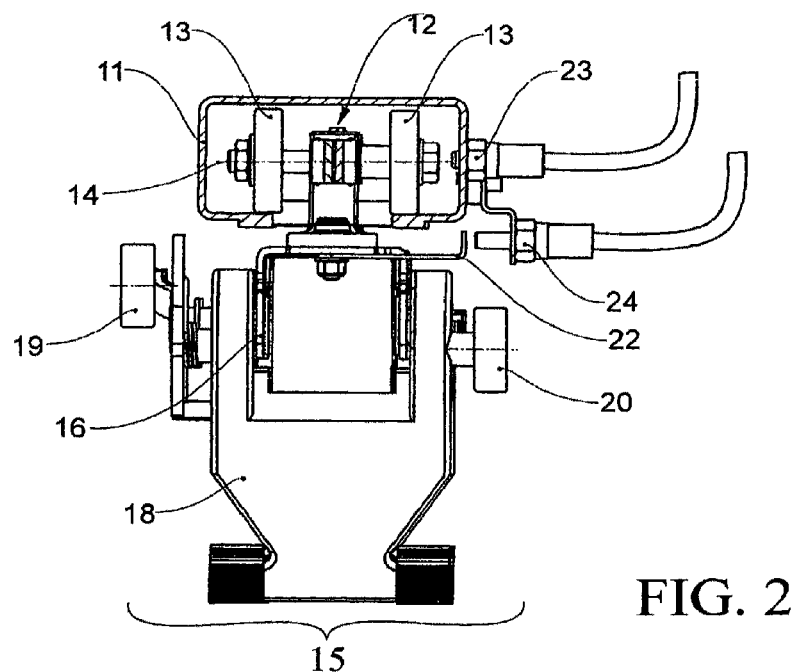
FIG. 2 shows a sectional illustration of the transport device from FIG. 1 in the section plane II-II.
Figure 3:
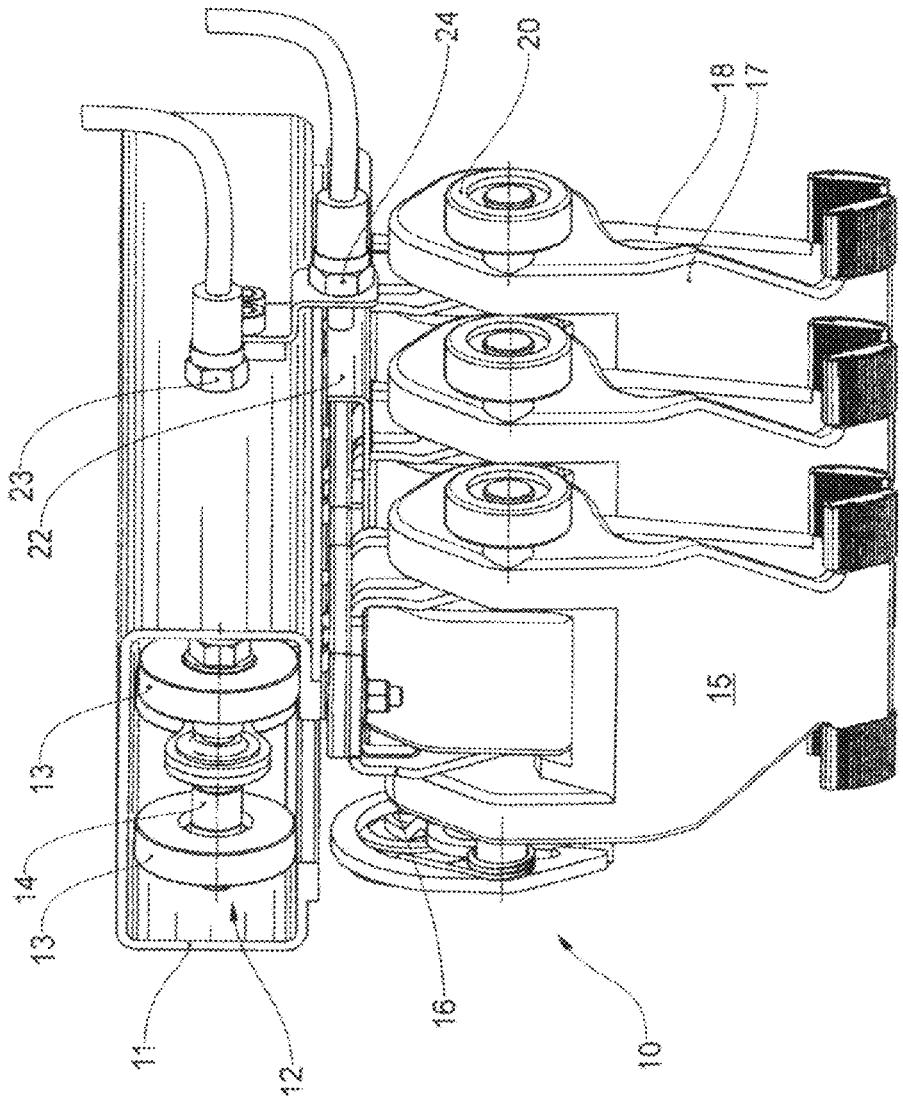
FIG. 3 shows a perspective side view of the section from FIG. 1.
Figure 6:
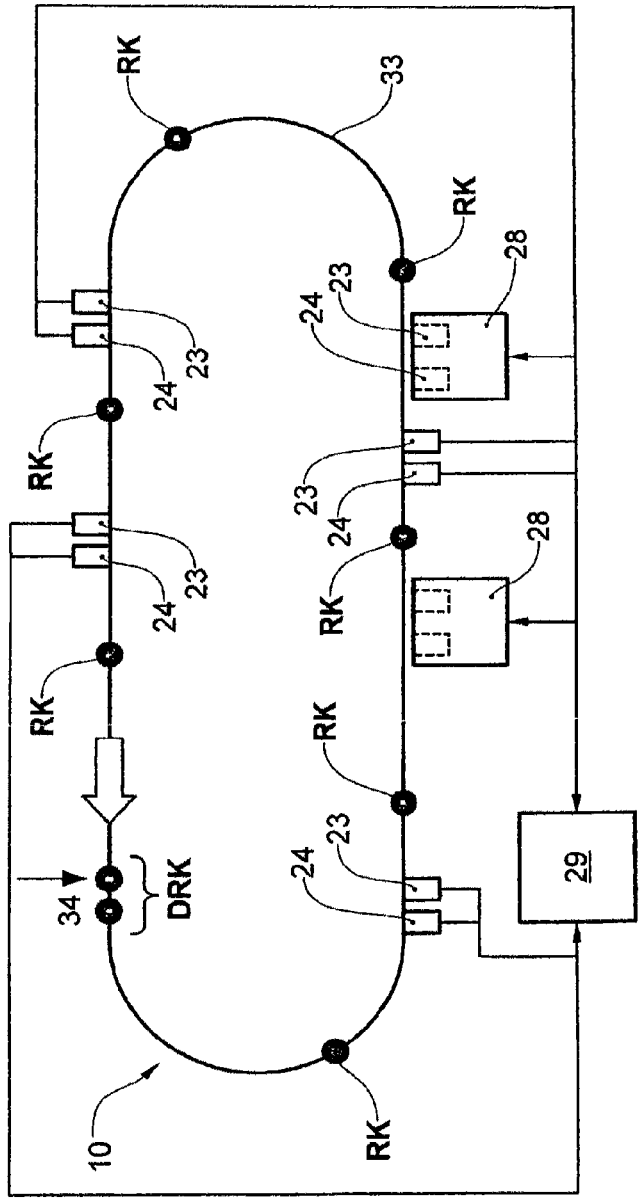
FIG. 6 shows a schematic illustration of the segmentation with a single starting point of a transport path according to an exemplary embodiment of the invention.

The section shown in FIGS. 1-3 is part of an intrinsically closed transport path which, as a rule, is substantially longer and which, in FIG. 6, is shown schematically as a simple oval bearing the reference symbol 33. It goes without saying that such a transport path 33 can lead through large halls and can then comprise thousands of grippers 15 on corresponding chain links. At selected points of such a transport path 33, according to FIGS. 1-3, the sensors 23 and 24 are arranged in a fixed manner and generate specific signals when the chain 12 with the grippers 15 fixed thereto moves past them.

A first sensor 23 is arranged laterally on the chain guide 11 at the height of the axles 14 of the chain 12 (see FIG. 2) and outputs a pulse-like clock signal Ts (see FIG. 4 and FIG. 5) which is composed of individual clock pulses 25 which each signal the passage of an axle 14 at the sensor 23. Since the axles 14 of the chain 12 usually have a constant spacing from one another, the time interval (t3 in FIG. 4) between successive clock pulses 25 is constant if the speed of the chain 12 is constant. In any case; a clock pulse 25 is output for each gripper 15 which passes the pair of sensors 23, 24.

A second sensor 24 is fitted obliquely underneath the first sensor 23 on the chain guide 11 in such a way that it is aimed with the sensor head into the space underneath the chain guide 11. The second sensor 24 responds to individual grippers 15 which—like the two grippers on the right in the example of FIG. 1—are equipped with appropriate cam switches 22 fitted to the supporting bracket 16 and projecting laterally. If such a gripper 15 equipped with a cam switch 22 is led past the second sensor 24, the second sensor 24 outputs a reference signal Rs (see FIG. 4 and FIG. 5). The reference signal Rs is either composed of individual reference pulses 26 (if only a single gripper 15 equipped with a cam switch 22 is led past the sensor; see FIG. 4) or a double pulse composed of two immediately successive reference pulses 26 and 27 (if, as illustrated in FIG. 1, two immediately successive grippers 15 are equipped with a cam switch 22 each; see FIG. 5).

Configuration and arrangement of the sensors 23 and 24, the cam switches 22 and the chain 12 with its axles 14 are such that the reference pulses 26 and 27 have a time period t1 which is considerably longer than the time period t2 of the clock pulses 25, and that a reference pulse 26, 27 and its associated clock pulse 25—as can easily be seen from FIG. 4 and FIG. 5—are located symmetrically with respect to a common central axis (dashed) (for the individual time periods shown, it is true that t1=t2+2(t4); t3=t5=t4+t6).

According to FIG. 6, individual reference grippers RK provided with a corresponding cam switch 22 are arranged distributed uniformly within the chain 12 over the entire length of the chain 12 (and the transport path 33), and subdivide the chain 12 (and the transport path 33) into equally long segments. The reference grippers RK generate individual reference pulses 26 according to FIG. 4 during operation of the transport device. The distance between two reference grippers RK is, for example, 100 to 200 grippers, which corresponds to a spacing of about 10-20 m. As viewed over such a segment length, what is known as the "jitter", which means the length change effected by the play of the individual chain links in relation to one another and additive position inaccuracy of the transport means in relation to one another effected thereby, does not play any role. The jitter manifests itself as a relative shortening of the chain during braking in the braked section and as a corresponding lengthening of the chain when pulled in the pulled section of the chain.

Arranged at a selected point of the chain 12 is a double reference gripper DRK according to FIG. 1, in which two immediately successive grippers 15 are each equipped with a cam switch 22. The double reference gripper DRK produces a double reference pulse 26, 27 according to FIG. 5 during operation of the transport device. In principle, however, it is also conceivable to arrange the two grippers with a gap between them or to provide three or more grippers with a cam switch in a type of "coded" arrangement.

The double reference grippers DRK and the associated double pulse (or another "coded" arrangement) define a starting point 34, from which, by means of simple counting, all the grippers 15 of the transport device can be assigned a progressive, unique serial number beginning with 1 (1, 2, 3, ... L−2, L−1, L in FIG. 5; L=total number of grippers). Here, starting point 34 is the second pulse 27 of the double pulse 26, 27.

If, then, on the transport path 33 according to FIG. 6, there are arranged a plurality of transfer stations 28 which feed products to or remove products from the grippers 15 or process products held in the grippers 15, the transfer stations 28 are able to detect both clock signal Ts and reference signal Rs with the aid of first and second sensors 23 and 24, respectively, assigned to them.

After the starting phase of the transport device 10, the transfer stations 28, since their fixed positions and the subdivided segment lengths of the chain 12 are known and preferably equal, are able to calculate the desired gripper number as soon as a transfer station 28 detects an individual reference gripper RK (reference pulse 26 in FIG. 4).

However, it is also conceivable to arrange additional pairs of sensors 23, 24 outside the transfer stations 28 and to connect them to a corresponding central control system 29 (FIG. 6).

Figure 7:
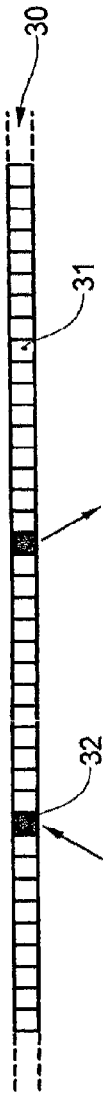
FIG. 7 shows the schematic illustration of a chain map as is used in an exemplary embodiment of the invention.

On account of the consecutive numbering of the grippers 15 of the transport device 10, a chain map 30 with a progressive series of small (symbolic) boxes 31 can be stored in the control system 29 (see FIG. 7), in which map each gripper 15 is assigned a small box 31. If a gripper 15 is occupied by a product, an entry is made or activated in the chain map 30 in the associated small box (product entry 32; illustrated shaded). The entry is removed or inactivated again when the product is removed from the gripper 15 or the latter gives up the product. In order that the chain map 30 always reflects the respective state of the gripper occupancy, the transfer stations 28 can make access to this chain map 30.

I claim:

1. A method for operating a transport device (10) comprising:
a plurality of identical transport means (15) arranged one after another in a transport direction, which transport means in each case are able to pick up at least one product to be transported, in particular a product in post press processing, and are able to transport it along an intrinsically closed transport path (33) between stations (28) arranged on the transport path (33), wherein, in order to identify an individual transport means (15), first sensors (24) detect a position of a selected transport means (RK), wherein the first sensors (24) are arranged on the transport path (33) as the transport means pass the first sensors (24), and which are arranged distributed over the transport path (33) and subdivide the transport path (33) into individual segments, wherein all the transport means (15) are assigned individually consecutive fixed serial numbers, which are counted from a single starting point (34), and in that a starting point (34) is defined by a specific arrangement of a plurality of detectable transport means (DRK).

2. The method according to claim 1, wherein the starting point (34) is defined by at least two directly successive detectable transport means (DRK).

3. The method according to claim 2, wherein the starting point (34) coincides with one of a second of the two successive detectable transport means (DRK) and the last of the plurality of detectable transport means (DRK).

4. The method according to claim 1, wherein, as the transport means (15) move along the transport path (33), by means of second sensors (23) arranged on the transport path (33) through the transport device (10), a clock signal (Ts) is generated, the clock pulses (25) of which can be assigned to the transport means (15), wherein the clock pulses (25) are additionally used to identify the individual transport means (15).

5. The method according to claim 4, wherein, as the first sensors (24) pass through the selected transport means (RK; DRK) a reference signal (Rs) is generated, the reference pulses (26, 27) from which can be assigned to the selected transport means (RK; DRK), and in that the reference pulses (26, 27) are correlated with selected clock pulses (25).

6. The method according to claim 5, wherein the reference pulses (26, 27) and the selected clock pulses (25) correlated therewith are in each case located symmetrically with respect to a common centre line.

7. The method according to claim 1, wherein a clock cycle map (30) of the transport device (10) is used, which comprises compartments numbered in accordance with the numbered transport means (15) of the transport device (10), in which an entry is activated when the corresponding transport means (15) picks up a product to be transported, and in which an entry is inactivated when the corresponding transport means (15) gives up a transported product.

8. The method according to claim 7, wherein the stations (28) arranged on the transport path (33) make access to the clock cycle map (30) of the transport device (10) and activate or inactivate corresponding entries when a product is introduced into a transport means (15) or removed from a transport means (15).

9. The method according to claim 1, wherein the transport device is a gripper transporter (10), in that the transport means in each case comprise a gripper (15) to hold a product detachably, and in that the grippers (15) are fixed to a chain (12) which is used to generate a clock signal (Ts).

10. The method according to claim 1, wherein the selected or detectable transport means (RK) are arranged distributed uniformly along the transport path (33) or the segments of the transport path (33) are equally long.

11. A transport device (1) for implementing the method according to claim 1, which transport device (10) has a multiplicity of identical transport means (15) arranged one after another in a transport direction, which transport means (15) in each case are able to pick up a product to be transported, in particular a product in post press processing, and are able to transport it along an intrinsically closed transport path (33) between stations (28) arranged on the transport path (33), first sensors (24) being arranged on the transport path (33), which are able to detect selected transport means (RK) arranged distributed along the transport path (33) as they pass, wherein a single selected point (34) in the series of transport means (15) is defined by a specific arrangement of a plurality of detectable transport means (DRK).

12. The transport device according to claim 11, wherein the selected point (34) is defined by at least two directly successive detectable transport means (DRK).

13. The transport device according to claim 11, wherein the selected transport means (RK) each have a signal generator, preferably a cam switch (22), which is moved past the first sensors (24) during the operation of the transport device.

14. The transport device according to claim 11, wherein the transport means (15) are fixed to a chain (12), and in that second sensors (23) for sensing the individual links of the chain (12) are arranged in the region of the chain (12).

15. The transport device according to claim 11, wherein the transport means (15) are designed as grippers, and in that second sensors for sensing the individual grippers are arranged in the region of the grippers.

* * * * *